United States Patent
Prasad et al.

(10) Patent No.: US 11,314,710 B2
(45) Date of Patent: Apr. 26, 2022

(54) SYSTEM AND METHOD FOR DATABASE SHARDING USING DYNAMIC IDS

(71) Applicant: PayPal, Inc., San Jose, CA (US)

(72) Inventors: Rashmi Vijaya Prasad, San Jose, CA (US); Biju Lalitha Soman, Milpitas, CA (US); Amit Athavale, Fremont, CA (US); Shiva Shankaran Ulaganathan, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 83 days.

(21) Appl. No.: 16/723,209

(22) Filed: Dec. 20, 2019

(65) Prior Publication Data

US 2021/0191913 A1 Jun. 24, 2021

(51) Int. Cl.
G06F 16/22 (2019.01)
G06F 16/25 (2019.01)
G06F 9/46 (2006.01)
G06F 16/23 (2019.01)
G06F 16/27 (2019.01)

(52) U.S. Cl.
CPC .......... *G06F 16/2246* (2019.01); *G06F 9/466* (2013.01); *G06F 16/2282* (2019.01); *G06F 16/2379* (2019.01); *G06F 16/256* (2019.01); *G06F 16/278* (2019.01)

(58) Field of Classification Search
CPC ............ G06F 16/2246; G06F 16/2379; G06F 16/2282; G06F 16/256; G06F 16/278; G06F 9/466
See application file for complete search history.

(56) References Cited

U.S. PATENT DOCUMENTS

| 6,275,813 B1* | 8/2001 | Berka | G06Q 40/02 705/30 |
| 2014/0189051 A1* | 7/2014 | Hunter | G06F 16/951 709/217 |

* cited by examiner

*Primary Examiner* — Jensen Hu
(74) *Attorney, Agent, or Firm* — Haynes and Boone, LLP

(57) ABSTRACT

Aspects of the present disclosure involve systems, methods, devices, and the like for database sharding. In one embodiment, a system and method are introduced which enable the use of dynamic IDs for use with database sharding. The dynamic ID enables the use of a hierarchical structure such that original and trailing transactional data are identically labeled. To enable the use and labeling two or more unsharded tables may be used.

20 Claims, 7 Drawing Sheets

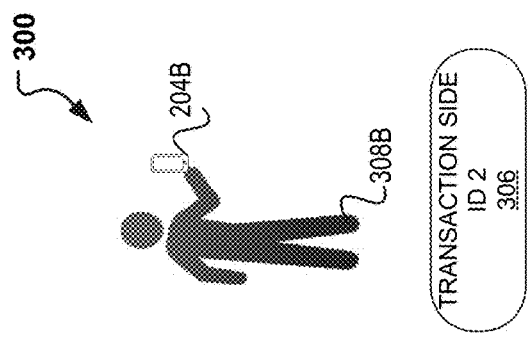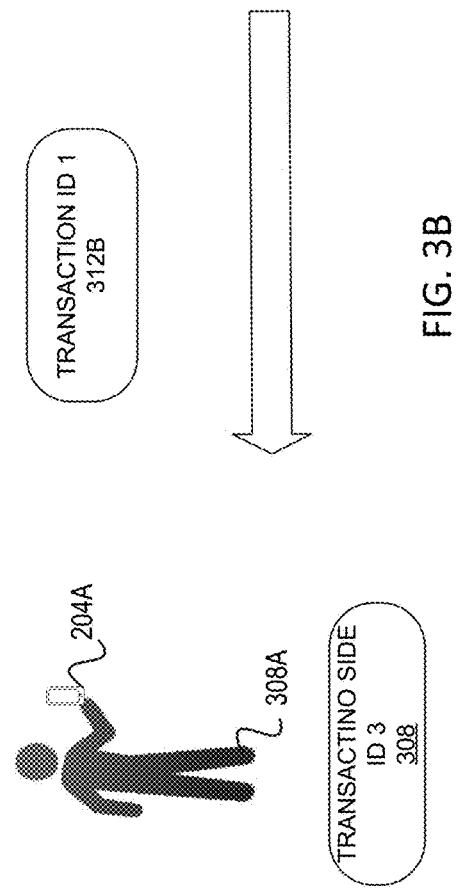

SYSTEM AND METHOD FOR DATABASE SHARDING USING DYNAMIC IDS

TECHNICAL FIELD

The present disclosure generally relates to communication devices for performing database sharding and more specifically, to database sharding using dynamic IDs.

BACKGROUND

In the advent of technology, industry has moved to the use of electronic devices and communications for processing transactions. As such, more and more data is being electronically captured and stored in databases, servers, and other storage components. Conventionally, data was stored in a single database or location, however with the growth of information, such solution is no longer viable. To accommodate such growth in data, sharding, a type of database partitioning, has been introduced to enable easier data management. Unfortunately, in some instances, data partitioning can cause the distributions of future operations from a single transaction to be distributed across multiple databases. Consequently, data can be incorrectly stored, retrieved, and misplaced. As such, it would be beneficial to create a system that enables transaction and corresponding operation tracking while using database sharding.

BRIEF DESCRIPTION OF THE FIGURES

FIGS. 3A-3B illustrate and exemplary transaction including the use of a transaction ID.

Figure 1A:
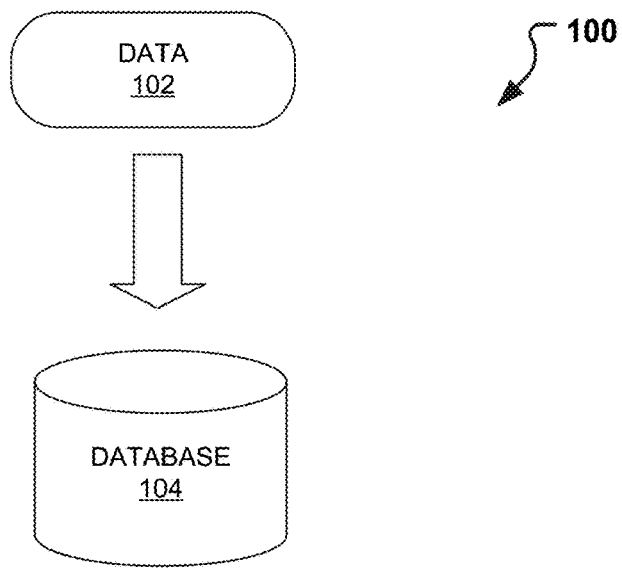
FIGS. 1A-1B illustrates exemplary diagrams illustrating data classification and storage.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for database sharding. In one embodiment, a system and method are introduced which enable the use of dynamic IDs for use with database sharding. The dynamic ID enables the use of a hierarchical structure such that original and trailing transactional data are identically labeled. To enable the use and labeling two or more unsharded tables may be used.

Figure 1B:
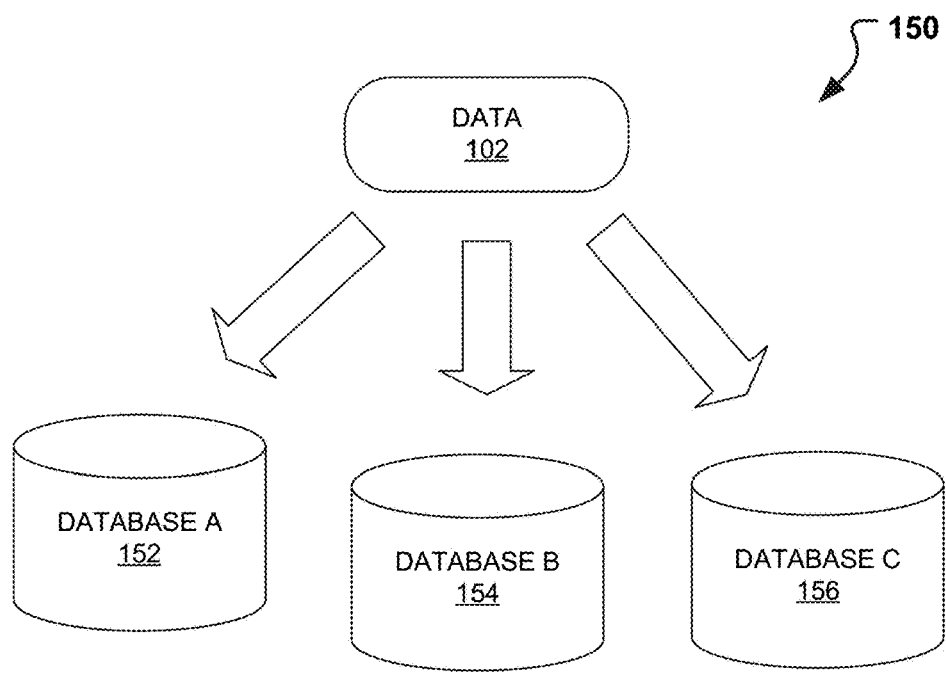

In the advent of technology, industry has moved to the use of electronic devices and communications for processing transactions. As such, more and more data is being electronically captured and stored in databases, servers, and other storage components. FIGS. 1A-1B illustrate exemplary diagrams demonstrating data classification and storage. For example, consider the block diagram 100 of FIG. 1A, where, as conventionally performed, data 102 received at a system is directly stored in a single database 104. Using this technique, however, can lead to very large databases. The databases may become so large, which can lead to slower and less manageable data retention and retrieval.

To mitigate this issue, industry and academia have introduced the concept of sharding. Sharding is a technique or type of database partitioning which separates data into smaller more manageable parts or shards. FIG. 1B illustrates an exemplary sharding block diagram 150. Currently, two main types of sharding techniques exist, database sharding and application sharding. Database sharding refers to the automatic distribution of data 102 between databases. That is to say, the application logic and/or user may not be involved or aware of how the data 102 is distributed or how queries are routed between the databases 152-156. Application sharding refers to the manual rebalancing and distribution of data 102 between databases 152-156. In application sharding, the application can control how the data is distributed and how the queries are routed between the 152-156. Application sharding and/or a combination of application and database sharding are considered here.

Generally, when sharding is used, a static identification number (ID) is used. For example, an account number, email, or other unique ID may be used as the identifier of the data or transaction. This type of identification maybe problematic though, for example in some instances the transactional data may not always be based on an account number or other static ID. In addition, if a static ID is used for the data, each database may need to be searched when performing data lookup, executing a report, or fetching the data itself. Additionally, if transactional data is being stored, a transaction may have further operations that will also need referencing. For example, consider a payment transaction. In this case, the payment may use one static ID, however as a refund, chargeback, or other operation occurs on that transaction these operations also need to be referenced. Having a static ID, thus becomes problematic as referencing becomes problematic and further the original transaction (parent or fresh activity) and posteriori operations (child or trailing activity) may be distributed across multiple databases. Consequently, data 102 can be incorrectly stored, retrieved, and misplaced. As such, it would be beneficial to create a system that enables transaction and corresponding operation tracking while using database sharding.

Figure 2:
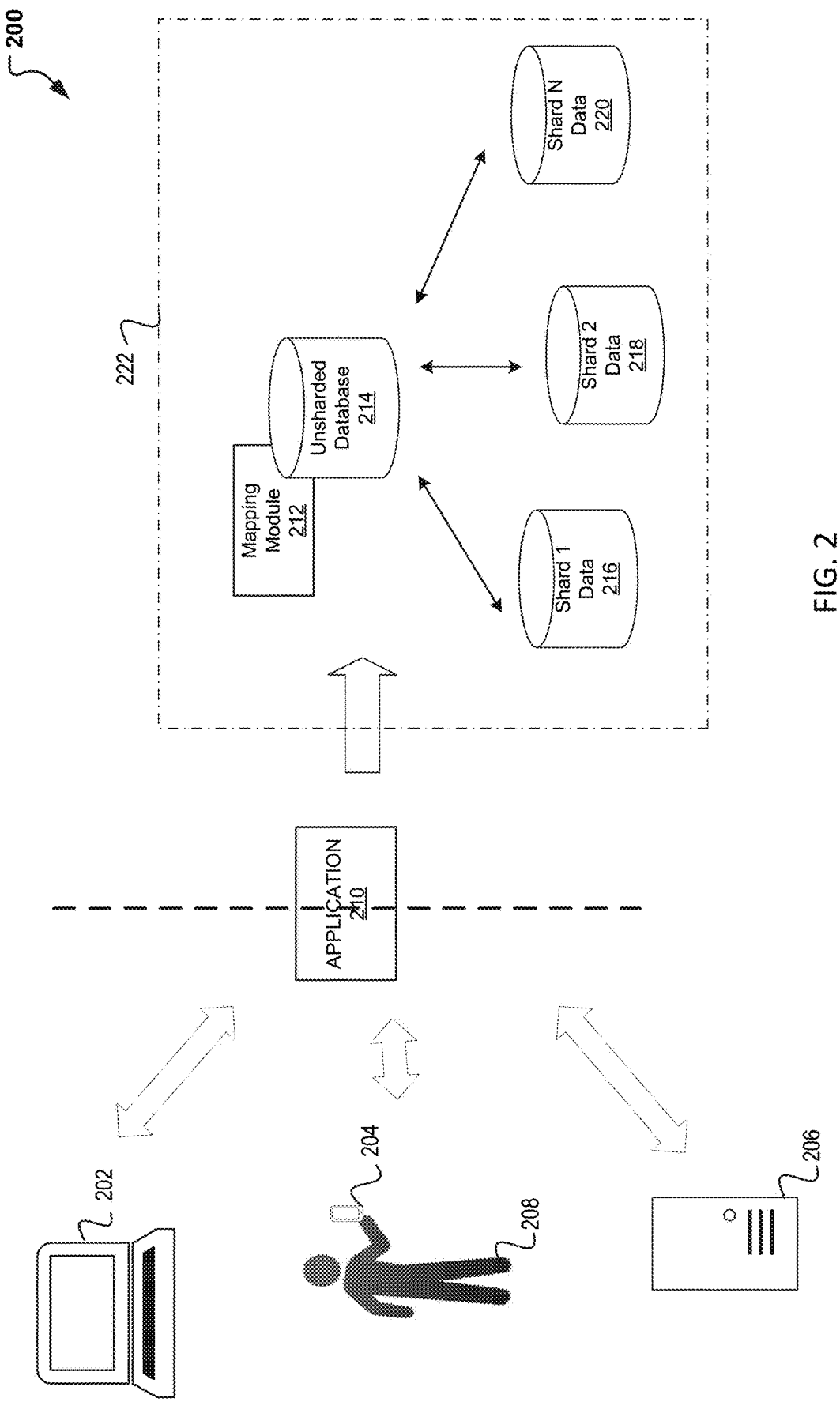
FIG. 2 illustrates exemplary system used for performing database sharding using dynamic IDs.

Turning to FIG. 2, a system is introduced for enabling the transaction and operation tracking using database sharding. In particular, FIG. 2 illustrates exemplary system used for performing database sharding using dynamic IDs. As indicated, transactional data can often carry additional operations (child activity) which need referencing from the initial transaction (parent activity). Additionally, if double entry booking exists, then traceability is important with regards to how the information is stored, shard, and referenced. For example, consider a transaction wherein a credit card is funding a transaction. Then, a record would exist which indicates the monetary transfer is coming from the credit card. Another record would then follow including the transfer of funds to that other person. Still another record can exist where funds are added to the other person's account. Finally, another record may still exist if a fee is associated with the transfer. Thus, the parent transaction includes this main data of which each may have its identifiers which all belong to the original transaction. And accordingly, the parent transaction including of funding a transaction using a credit card and all its aspects including the deposit and fee should be transactionally and atomically committed to one specific database. Additionally, as the additional lifecycle operations are received, these too should be similarly committed. Again, continuing with the credit card transaction, if a chargeback or refund is received, these trailing operations should also be committed and available to be referenced with the parent or original transaction.

As such, transactional information may derive from a personal device 202, a user device 204 as a user 208 interacts with the device, and/or other system/entity/or device 206. The transactional data may be any type of transactional data received which could benefit from database storage and in particular shard database storage. The device 202-206 can include any device including a tablet, iPad, cell phone, smartphone, laptop, desktop, vehicle, internet of things (IoT) device, or the like. For exemplary purposes, per personal device 202 is a laptop, user device 204 is a smartphone, and device 206 is system or other external entity communicating with the application 210. The device 102 may be used for web browsing, video streaming, bill payments, and online purchases. Additionally, the device 102 may be equipped with applications that enable the user to make purchases and transfers using payment provider applications and/or a digital wallet. Further, the device 102 may be capable of making phone calls and communicating with one or more other communications devices using a cellular network, Wi-Fi, Bluetooth, BLE, NFC, WLAN, etc. The communication can enable the transmission of information from a user account to a secondary source. In addition, the communication can enable the transmission of photographs, pictures, video, biometrics, and the like for user authentication. The communication can also enable to communication of transactional activity. For example, transactional activity may be transmitted to an application 210, third-party receipt, or other for data store.

The application 210 can be any application used for transacting. For example, the application 210 can be an application on a device which may receive information including transactional activity. In one embodiment, the application can be an application on a digital wallet, a financial services application, or other third-party provider capable of processing or enabling a payment transaction. As an illustration consider an application being used to process a payment with a merchant and/or user 208. In this instance, the device 202-206 is able to communicate with the application 210 for the payment processing. The application 210 having received the information, in addition to processing the transaction, also stores and manages the transactional record and activity associated with the transaction. As indicated above, a transaction can include the initial transactional information of parent activity and can have subsequent child activity. The parent activity including the transfer and payment of money and fees, while the child activity can include subsequent data received in response to a refund, backcharge, credits, disputes, or the like.

For storing, managing, and retrieving the activity, a sharding system 222 is introduced. The sharding system 222 is designed to maintain double entry booking. That is to say, the sharding system 222 is introduced to enable database partitioning while maintaining transactional data and related activity available for retrieval using dynamic IDs. In addition, the sharding system 222 is capable of maintaining both debit and credit side activity. To enable this dynamic ID sharding, the sharding system 222 includes a mapping module 212. The mapping module 212 may be a component designed to analyze and tabulate data, as well as generate dynamic IDs for use in the data sharding. In the analyzing, the mapping module 212 may begin with the treatment and implementation of a hierarchical data structure where the parent activity becomes the top a of tree (main node) and the child activity or other reference data coming in are the branches. As such, the parent is provided with a unique identifying transactional ID or root transaction ID (RTID). To obtain the key, the mapping module 212 may maintain at least two unshared tables or databases 214 which may be used for both the assignment and the mapping of the key. In one embodiment, a first table of unsharded database 214 is generated and maintained with unique RTIDs which may be used and assigned to the parent transaction. Accordingly, the RTID assigned to the parent transaction becomes the key assigned to the entire tree. That is to say, any secondary data or child activity that is then received is then assigned the same RTID. To ensure this occurs, the mapping module 212 may include a secondary table. In one embodiment, a second unsharded table or database is maintained to tabulate the RTID assigned to the parent and then mapped to the child activity or other data associated with the parent. Therefore, the secondary indexed or unsharded table is used to determine the tree identifier for a given transaction ID, such that when you get the tree identifier or RPID, a corresponding shard may be determined and the corresponding database from the shard databases 216-220 may be accessed to fetch, store, or otherwise manage the data. Therefore, as the parent transaction is taking place, each of the identifiers (e.g., payment, fees) received a same transaction ID (e.g., RTID) and then as the subsequent activity is then mapped to the same transaction ID or root payment identifying key.

To exemplify this, consider FIGS. 3A-3B, wherein an exemplary payment is being executed between two users 208. In particular, FIGS. 3A-3B illustrate and exemplary transaction including the use of a root transaction ID. Turning first to FIG. 3A, as exemplified, a user 208A is communicating and transacting with another user 208B. Using sharding system 222, mapping module 212 may be used to obtain and assign the data a Root Transaction ID 302.

As indicated when a transaction is occurring, the parent activity can include a series of actions or events occurring on the data. For example, as presented above, a record can include the money that is coming from a credit card that will be used to fund the transaction. Another record includes the indication that the money will be sent to another person. Still another record includes the other person's receipt of the money. Yet another record can include the fee associated with the transaction. Accordingly, each record would include an identifier. However, in the implementation and use of the sharding system 222, a single transaction ID is now being assigned and used for this parent activity. Thus, all the identifiers can be reference under the single transaction ID.

Next, because some transactions (e.g., payments) may include two or more parties, a double entry bookkeeping approach may be used. As such, two or more transaction sides may exist and consequently transaction side IDs. For example, consider FIG. 3A, a transaction is occurring between two users 208A, 208B and as such, the first user 208A may be designated a transaction side 1 304 while the second user 308B. However, because the activity is all related to a single transaction, a single transaction ID 312A is used to track the activity despite the identifiers for each of the records associated with the transaction. Similarly, despite the transaction side ID 304-306 used, the hierarchical bookkeeping system continues with the use of a single transaction ID 312A. Additionally, because a tree structure is used by the sharding system 222, the entire record or parent activity is given a common root transaction ID 302 which is maintained by an unsharded database (e.g., managed by mapping module 212 and stored in unsharded database 214) for reference in later reporting, retrieving, and/or for use in later association of other reference or child transaction activity.

Turning next to FIG. 3B, an associated credit may be provided to the first user 208A by a third user 208C. This credit although distinct and including, yet another (third) party in the bookkeeping is still related to the original parent transaction. Again, as illustrated, a multi-sided transaction will take place and accordingly transactional IDs may be used and designated for teach side. At FIG. 3B for example, the first user 308A may now partake in transaction side ID 3 308 and consequently the third user 308C providing the credit is now associated with transaction ID 4 with reference to the transaction as transaction ID 1 312B and the change in status may be propagated to the parent. However, as indicated, despite the reference record and transaction side considered, an association with the parent transaction is maintained and as such the transaction between the first and third users 308A, 308C are associated with root transaction ID 302. Now in consideration of both FIGS. 3A-3B note that as illustrated FIG. 3A may include the parent activity and FIG. 3B may include child activity, both transaction IDs 312 refer to the same overall parent ID or share a common root transaction ID 302. Additionally, or alternatively, the transaction ID 312 is the root transaction ID 302.

Note that as illustrated and described above and in conjunction with FIG. 3B, a child activity was discussed. However, this exemplary diagram is not so limited and instead, FIGS. 3A-3B can include a forward and reverse communication (transaction) between first and second users 308A-B. Also note that in addition to the root transaction ID identified and tabulated by the sharding system 222, the transaction ID, transaction side ID, and other identifiers may also be tabulated and associated with the records or the transaction. Additionally, although a payment transaction is used herein, not that this is for exemplary purposes and other transactional data may be recorded using the dynamic ID and hierarchical sharding system 222 presented and discussed. Thus, records including multiple identifiers, including parent/child data, including multiple-parties, or the like may use and take advantage of dynamic IDs for improved database scalability, availability, and latency.

Figure 4:
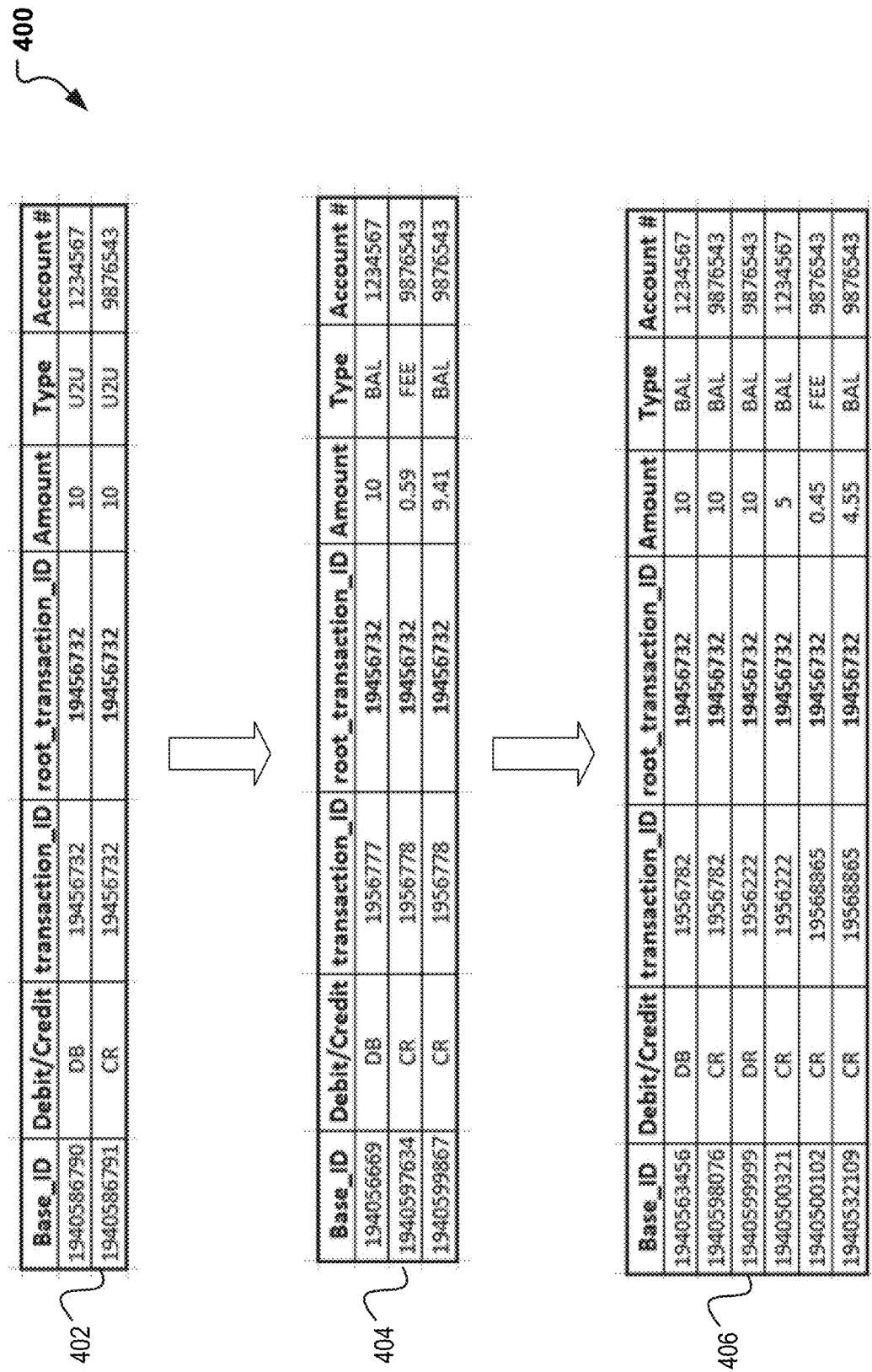
FIG. 4 illustrates an exemplary implementation of the dynamic ID.

Turning next to FIG. 4, an exemplary implementation of the dynamic ID is illustrated. In particular, FIG. 4 illustrates the use of the root transaction ID 312 as would be included and tabulated in the unsharded database 214. As indicated above, the sharding system 222 may be designed to include a mapping module 212 design to designate a root transaction ID to the parent activity and then continue to map any child activity to the same root transaction ID. The root transaction ID and mapping may be maintained in at least two tables in an unsharded database 214. Once a root transaction ID has been added to the activity record, the data may then be sharded in one of a plurality of shard databases 216-220.

At FIG. 4, exemplary records are illustrated presenting tables that may used to record the activity. Turning first to table 402, an exemplary payment side operations table is presented. At table 402, as presented a record is being maintained for a transaction between two users (user-to-user). A first user is debiting a $10 amount from his account and consequently record one illustrates a debit for $10 and the associated user account number. The second user, receiving the amount is receiving the transfer amount. As such, the second record includes a credit for $10 in a user-to-user transaction with reference to that user's account number. Now as indicated, a root transaction ID is being included in the parent activity. As such, a common root_transaction_ID 19456732 is associated with both records.

Turning next to table 404, a money movement included in the transaction occurring between the two users is illustrated. Table 404 is designed in continuation of the user-to-user transaction at table 402. As illustrated, table 404 is design for recordkeeping of the movement the money is making as the transaction occurs. The records illustrated here present the first user's account impacted with a $10 debit and then proceeding adjustments at the money is being transferred. For example, a second record illustrates a fee associated with the transfer that is now being credited and then the credit to the second user account for the reminder. Again, because this activity is associated with the parent activity, a same root_transaction_ID is used (e.g., root_transaction_ID 19456732), despite the fact that double entry is occurring. (cc payment with fee associated with it)

In some instances, additional activity may occur that is associated with the original user transaction. Such activity, referred here as child activity will continue to reference the parent and as such use a same ID. To illustrate this, consider table 406 where the original user involved in the transfer of money is now transacting once again with the secondary user (e.g., a credit card entity or other financial entity). Here, the user may be attempting to make a purchase whose final amount is yet to be determined. To authorize this transaction, the second user may capture an amount (assumed to cover the transaction) from the user account, if this is available then the transaction is authorized, the balanced credited to the first user and the transaction amount (and associated fees) provided to the secondary user. Illustrated again, is the user with the same root_transaction_ID 19456732 as previously done with the parent activity and available for use in sharding in order to maintain related data in order and easily accessible.

Note that the tables 402-406 illustrated here are for exemplary purposes and other tables, columns, records, labels, etc. may be captured and recorded. Additionally, these records may be for any transaction and the payment example presented herein was for exemplary purposes. In addition, the tables illustrated may be presented and stored in a varied format than that illustrated. Also note that records and other reports may also be obtained from a platform or application (not shown) which can present the records in a similar or varying manner. The tables 420-406 are primarily presented to illustrate the use of the dynamic ID which is used to maintain the hierarchical system design to enable a tree and all its branches (parent and child) similarly referenced.

Figure 5:
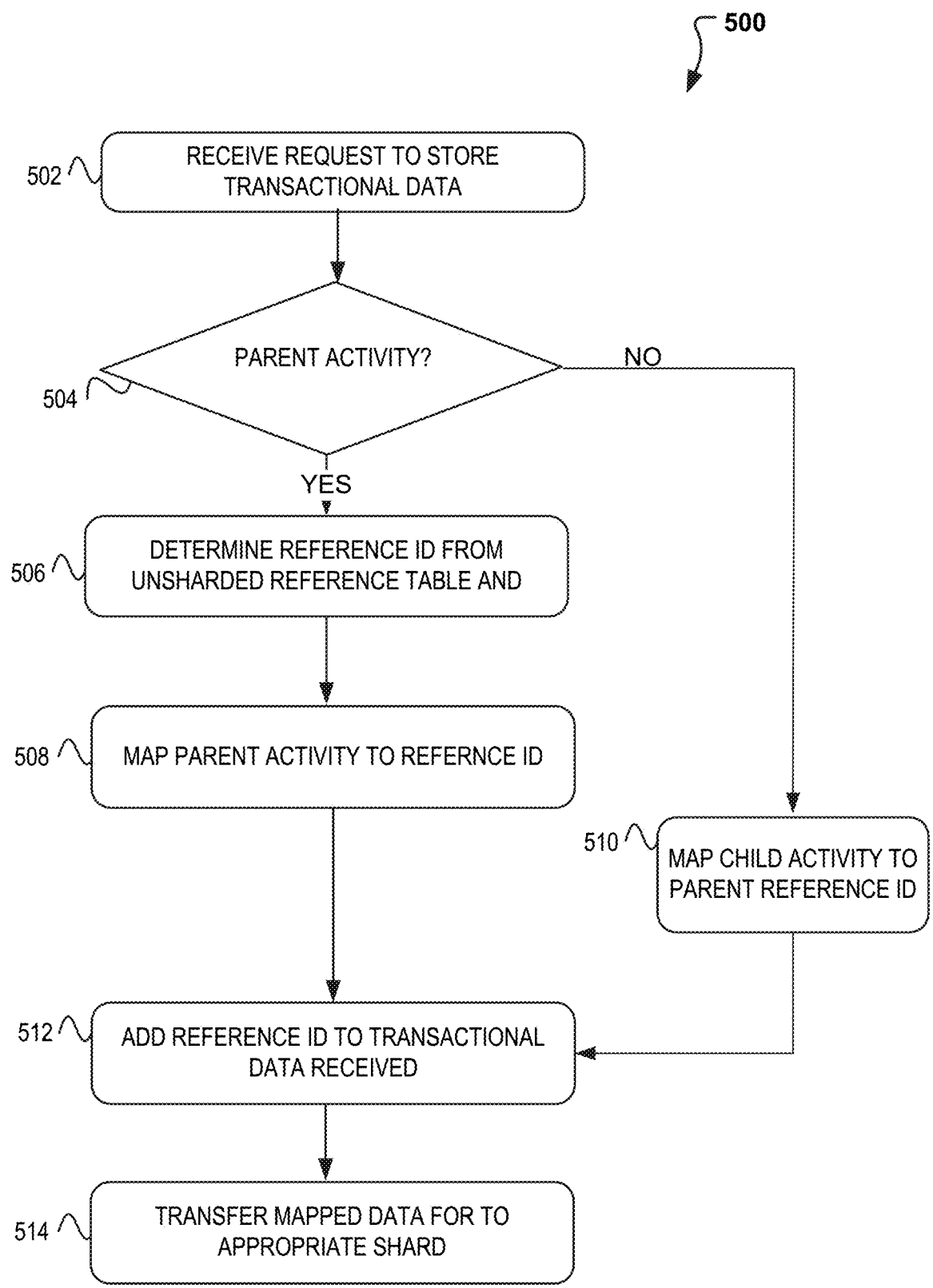
FIG. 5 illustrate flow diagrams illustrating operations for performing database sharding using dynamic IDs.
Figure 7:
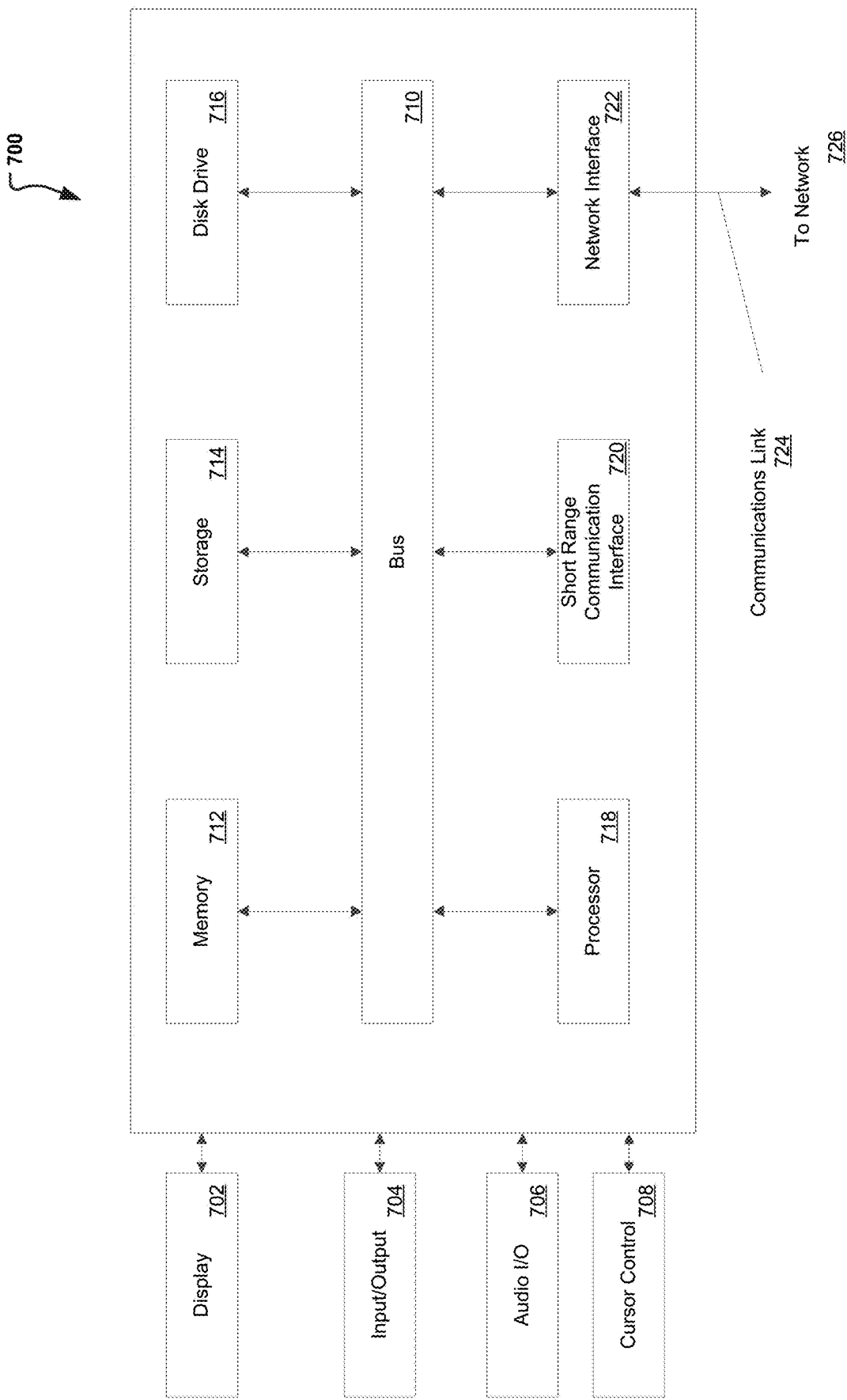
FIG. 7 illustrates an example block diagram of a computer system suitable for implementing one or more devices of the communication systems of FIGS. 1-6.

FIG. 5 illustrate example process 500 for obtaining a dynamic ID that may be used and implemented in a sharding system and available via a system such as system 700 of FIG. 7 and/or sharding system 222 of FIG. 2. In particular, FIG. 5 illustrates a flow diagram illustrating operations for obtaining the dynamic root_transaction_ID.

In FIG. 5, according to some embodiments, process 500 may include one or more of operations 502-512, which may be implemented, at least in part, in the form of executable code stored on a non-transitory, tangible, machine readable media that, when run on one or more hardware processors, may cause a system to perform one or more of the operations 502-512.

Process 500 may begin with operation 502, where a request may be received for the storage and management of transactional data. As has been described, the request may derive from an application and/or directly from a device associated with a user or entity. As the data is received by the sharding system, a first decision is made at operation 504, wherein the data is analyzed to determine if it is fresh transactional data associated with parent activity or subsequent and trailing data and child data associated with a previous transaction or parent transactional data. If the decision is made that the data received is associated with parent activity, then process 500 continues to operation 506. At operation 506, the mapping module may be used to determine and obtain a reference ID (root_transaction_ID) from a first table that may be accessible from an unsharded database. The reference ID may be dynamically generated, or may be pre-defined based in part on the type of transaction, user profile, entity, etc.

Once the data has been assigned the initial reference ID at operation 506, process 500 continues to operation 508. At operation 508, the reference ID is mapped and/or associated to the parent activity. Therefore, a second table may be available to map the now associated parent activity. Accordingly, at operation 512, the process 500 continues with the addition of the reference ID (root_transaction_ID) to the data received with the request.

Alternatively, if at operation 504, it is determined that the data received with the request in not parent activity, but instead is trailing or child activity associated with a previous parent activity, then process 500 continues instead to operation 510. At operation 510, the root_transaction_ID associated with the parent ID is now mapped to and associated with the child activity. To perform this operation 510, the mapping module or other similar component may determine that indeed there is a corresponding parent and reference ID associated with the trailing activity received. Once determined, the unsharded database may be accessed and use to identify and map the child activity at operation 512. As the parent and/or child activity is mapped, the process 500 may continue to operation 514 to transfer the now mapped and IDed data to the appropriate shard.

Note that process 500 may include more or less operations. Operations 502-514 and are for exemplary purposes and the order and number of operations may be modified. For example, the mapping and referencing may be simultaneously done such that a single operation is needed. Additionally, note that although transactional data has been used here to describe the data received for sharding, any type of data may be used and stored using the dynamic ID. Accordingly, payment transactions and other transactional data referenced here was used here for exemplary purposes.

Figure 6:
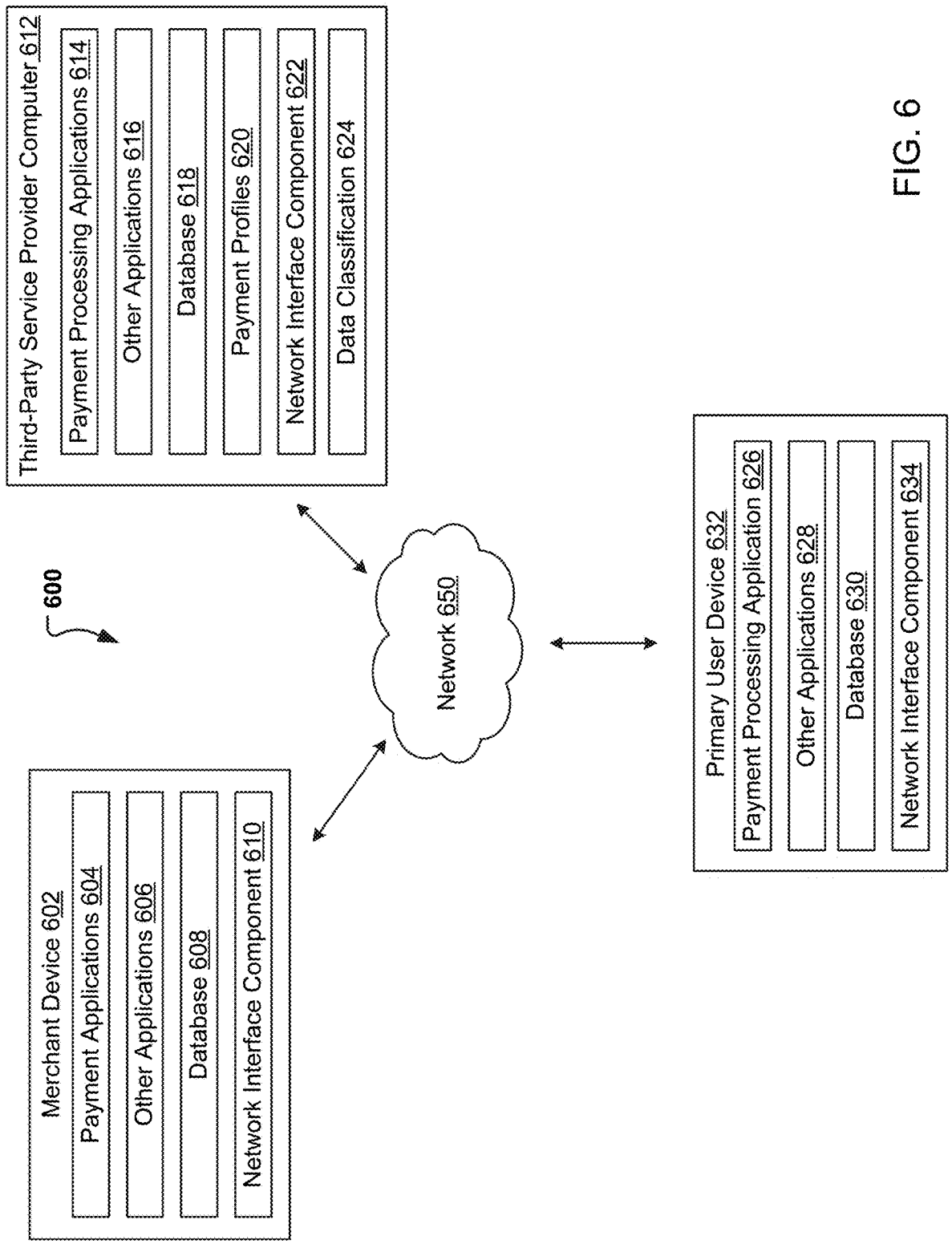
FIG. 6 illustrates a block diagram of a communication between systems used in transactions whose information is stored using database sharding with dynamic IDs.

FIG. 6 is a block diagram of a networked system 600 for implementing the processes described herein, according to an embodiment. In particular, FIG. 6 illustrates a block diagram of a system 600 for making, storing, and retrieving transactional information using database sharding. As shown, system 600 may include or implement a plurality of devices, computers, servers, and/or software components that operate to perform various methodologies in accordance with the described embodiments. It will be appreciated that the devices, computers, and/or servers illustrated in FIG. 6 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 600 includes a merchant/vendor device 602, a primary user device 632, a third-party service provider computer 612 in communication over a network 650. These devices 602, 632, and 612 are exemplary devices that may interact during a transaction that may result in a data storage and retrieval including the use of database sharding using dynamic IDs.

The merchant device 602, primary user device 632, and the third-party service provider computer 612 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 600, and/or accessible over network 650.

The merchant device 602 may be implemented as a communication device that may utilize appropriate hardware and software configured for wired and/or wireless communication with the primary user device 632 and third-party service provider computer 612. For example, the merchant device 602 may be implemented as a personal computer (PC), a smart phone, laptop/tablet computer, point-of-sale device, wristwatch with appropriate computer hardware resources, eyeglasses with appropriate computer hardware, other type of wearable computing device, implantable communication devices, servers, and/or other types of computing devices capable of transmitting and/or receiving data. The merchant device 602 may correspond to and be utilized by a user, such as an employee of a merchant and/or another person authorized by the merchant, or independently as a stand-alone system.

The merchant device 602 may include one or more payment applications 604, other applications 606, a database 608, and a network interface component 610. The payment applications 604 and other applications 606 may correspond to executable processes, procedures, and/or applications with associated hardware. In other embodiments, merchant device 602 may include additional or different components having specialized hardware and/or software to perform operations associated with the payment applications 604 and/or the other applications 606.

The payment application 604 may facilitate financial transactions corresponding to the sale of goods and/or services offered by the merchant. For example, the payment application 604 may provide an interface for customers to purchase the goods or services and to receive customer payment information (e.g., customer credit card information). The payment application 604 may further transmit customer payment information to a payment processor (e.g., such as a payment processor corresponding to the third-party service provider computer 612) to process the customer payment information. The payment application 604 may also facilitate other types of financial transactions such as banking, online payments, money transfer, and/or the like.

The merchant device 602 may execute the other applications 606 to perform various other tasks and/or operations corresponding to the merchant device 602. For example, the other applications 606 may include security applications for implementing client-side security features, programmatic client applications for interfacing with appropriate application programming interfaces (APIs) over network 650, or other types of applications. In various embodiments, the other applications 606 may include social networking applications. Additionally, the other applications 606 may include device interfaces and other display modules that may receive input and/or output information. For example, the other applications 606 may include a graphical user interface (GUI) configured to provide an interface to the user.

The merchant device 602 may further include a database 608, which may be stored in a memory and/or other storage device of the merchant device 602. The database 608 may include, for example, identifiers (IDs) such as operating system registry entries, cookies associated with the payment application 604 and/or other applications 606, IDs associated with hardware of the network interface component 610, IDs used for payment/user/device authentication or identification, and/or other appropriate IDs. The database 608 may also include information corresponding to one or purchase transactions of customers who have purchased goods or services from the merchant, browsing histories of the customers, or other types of customer information. In certain embodiments, the merchant device 602 may also include information and IDs corresponding to payments for tracking the transaction and operations associated with the transaction generated or with another user, a primary user device 632 and/or the third-party service provider computer 612.

The merchant device 602 may also include at least one network interface component 610 configured to communicate with various other devices such as the primary user device 132, and/or the third-party service provider computer 612. In various embodiments, network interface component 610 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like.

The third-party service provider computer 612 may be maintained, for example, by a third-party service provider, which may provide payment processing services for the merchant. In one example, the third-party service provider may be provided by PAYPAL™ Inc. of San Jose, Calif., USA. Alternatively, the third-party service provider computer 612 may be associated with a user of the primary device 632. As such, the third-party service provider computer 612 includes one or more payment processing applications 614, which may be configured to process payment information received from the merchant device 602 or from a selection at the primary user device 632. In addition, the payment processing services can be tied to a processing system like PAPPS 106 which can aid in transaction post-processing. For example, the payment application 604 of the merchant device 602 may receive payment information from a customer to purchase a service or good offered by the merchant. Upon receipt of the payment information, the payment application 604 may transmit the payment information to the third-party service provider computer 612. The payment processing application (or third-party payment application system) 614 of the third-party service provider computer 612 may receive and process the payment information. As another example, the payment application 604 can present a payment code on a display of the user device associated with the merchant. The payment code can be scanned or transmitted to the merchant device 602 for payment processing. Still as another example, the payment processing application can present a successful transaction notification on the display of the user device when the application has been authorized and ready for post-processing.

The third-party service provider computer 612 may execute the other applications 616 to perform various other tasks and/or operations corresponding to the third-party service provider computer 612. For example, the other applications 616 may include security applications for implementing client-side security features, programmatic client applications for interfacing with appropriate APIs over the network 650, or other types of applications. The other applications 616 may also include additional communication applications, such as email, texting, voice, and IM applications that enable communication of emails, calls, texts, and other notifications through the network 650. In various embodiments, the other applications 616 may include location detection applications, such as a mapping, compass, and/or GPS applications, which may be used to determine a location of the third-party service provider computer 612. Additionally, the other applications 616 may include device interfaces and other display modules that may receive input and/or output information. For example, the other applications 616 may include a GUI configured to provide an interface to one or more users.

The third-party service provider computer 612 may further include a database 618, which may be stored in a memory and/or other storage device of the third-party service provider computer 612. The database 618 may include, for example, IDs such as operating system registry entries, cookies associated with the payment processing application 614 and/or other the applications 616, IDs associated with hardware of the network interface component 622, IDs used for payment/user/device authentication or identification, transaction IDs, IDs for tracking transactions, (e.g., root payment IDs), and/or other appropriate IDs.

According to a particular embodiment, the third-party service provider computer 612 may include a set of payment profiles 620 corresponding to past sales transactions executed by the merchant device 102 with respect to one or more customers of the merchant. Alternatively, the third-party service provider computer 612 may include a set of merchant payment profiles corresponding to the payment sources associated to a corresponding merchant. For example, a particular payment profile from the set of payment profiles 620 may include payment information corresponding to a particular customer of the merchant and/or a merchant associated with a user. The payment information may include credit card information (e.g., encrypted card number, expiration date, security code, card issuer, and/or the like), Automated Clearing House (ACH) information (e.g., encrypted account number, routing number, and/or the like), identification information associated with the particular customer/user (e.g., a customer identifier, name, address, phone number, date of birth, and/or the like), billing information, credit score, and/or any other type of payment information associated with the particular customer. Furthermore, other payment profiles of the set of payment profiles 620 may include payment information corresponding to other customers of the merchant and/or other merchants associated with the user. In addition, the third-party service provider computer 612 may store the set of payment profiles 620 according to a first file format.

The third-party service provider computer 612 may also store a set of payment tokens corresponding to the set of payment profiles 620. For example, each payment profile of the set of payment profiles 620 may be associated with a corresponding payment token from the set of payment tokens. In some embodiments, each payment profile may include a corresponding payment token from the set of payment tokens. The set of payment tokens may be particular to the third-party service provider computer 612 (e.g., computers from other service providers may be unable to use the set of payment tokens) and may enable the merchant device 602 to more securely process payment transactions with the third-party service provider computer 612. For example, in order to process a payment transaction that involves a credit card number associated with a particular payment profile, the third-party service provider computer 612 may provide the merchant device 602 with a particular payment token that is different from the credit card number. The merchant device 602 may use the particular payment token to process the payment transaction instead of the credit card number. Further, the merchant device may store and associate the particular payment token with the particular payment profile instead of the credit card number, thereby protecting the credit card number from being stolen in a potential security breach of the merchant device 602.

In various embodiments, the third-party service provider computer 612 also includes at least one network interface component 622 that is configured to communicate with the merchant device 602, the primary user device 632, and/or the secondary user device 636 via the network 650.

The third-party provider computer 612, may also include a data classification component 624 that may be used for data sharding classification. In one embodiment, the data may be received, and a root identifier added for tracking while database sharding using at least computer 612 and/or stored in database 618 (e.g., unsharded and shard databases described above) can be analyzed to identify common or root transactions or information and associated operations.

The primary user device 632 may be implemented as a communication device that may utilize appropriate hardware and software configured for wired and/or wireless communication with the merchant device 602 and third-party service provider computer 612. The primary user device 632, may be a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In one embodiment, the primary user device 632 may be mobile device communicating with wearable device (or secondary user device), merchant device 602, or directly with the third-party service provider system 612.

The primary user device 632 may include a payment processing application 626 that may be used as a digital wallet that can communicate with a merchant device 602, a secondary user device, and/or third party service provider 612 for purchasing and transacting. The payment processing application 626, can work jointly with database 630 for retrieving bank account information, user accounts, security codes, identifiers, tokens, etc., that may be associated with various merchant locations, transactions, etc. Similarly, the payment processing application, can also provide access the user profiles for determining which payment method, processing code, to use at a merchant location.

The primary user device 632 may also include other applications 628 to perform various other tasks and/or operations corresponding to the primary user device 632. For example, the other applications 628 may facilitate communication with the merchant device 602, such as to receive an indication, from the merchant device 602, to switch payment processing services from the third-party service provider to the service provider. As another example, the other applications 628 may include security applications, application that enable designation of a primary interactive device, and applications that allow for web site searches (including access to merchant websites). The other applications 628 may also include additional communication applications, such as email, texting, voice, and IM applications that enable communication of emails, calls, texts, and other notifications through the network 650. In various embodiments, the other applications 628 may include location detection applications, such as a mapping, compass, and/or GPS applications, which may be used to determine a location of the primary user device 632. The other applications 628 may include social networking applications. Additionally, the other applications 628 may include device interfaces and other display modules that may receive input and/or output information. For example, the other applications 628 may include a GUI configured to provide an interface to one or more users.

The primary user device 632 may further include a database 630, which may be stored in a memory and/or other storage device of the primary user device 632. The database 630 may include, for example, identifiers (IDs) such as operating system registry entries, cookies associated with a web browser and/or the other applications 628, IDs associated with hardware of the network interface component 634, IDs used for payment/user/device authentication or identification, bank information, merchant information, user accounts, and/or other appropriate IDs.

The primary user device 632 may also include at least one network interface component 634 configured to communicate with various other devices such as the merchant device 602 and/or the third-party service provider computer 612.

Note that although a primary user device 632, a third-party service provider computer 612, and merchant device 602 are illustrated, a credit card provider may also be included and used in communication with the third-party service provider computer 612 and/or merchant device 602 for performing an electronic transaction. Additionally, or alternatively, the merchant may be accessed digitally through a network over a computer website on the primary user device 632 and the merchant device may instead be the credit card provider used for processing the electronic transaction.

FIG. 7 illustrates an example computer system 700 in block diagram format suitable for implementing on one or more transactions and allocations as described above and in conjunction with FIGS. 1-6. In various implementations, a device that includes computer system 700 may comprise a computing device (e.g., a smart or mobile device, a computing tablet, a personal computer, laptop, wearable device, PDA, server, etc.) that is capable of communicating with a network 726. A service provider and/or a content provider may utilize a network computing device (e.g., a network server or third-party service provider computer 612) capable of communicating with the network 726. It should be appreciated that each of the devices utilized by users, service providers, and content providers may be implemented as computer system 700 in a manner as follows.

Additionally, as more and more devices become communication capable, such as new smart devices using wireless communication to report, track, message, relay information and so forth, these devices may be part of computer system 700. For example, windows, walls, and other objects may double as touch screen devices for users to interact with. Such devices may be incorporated with the systems discussed herein.

Computer system 700 may include a bus 710 or other communication mechanisms for communicating information data, signals, and information between various components of computer system 700. Components include an input/output (I/O) component 704 that processes a user action, such as selecting keys from a keypad/keyboard, selecting one or more buttons, links, actuatable elements, etc., and sending a corresponding signal to bus 710. I/O component 704 may also include an output component, such as a display 702 and a cursor control 708 (such as a keyboard, keypad, mouse, touchscreen, etc.). In some examples, I/O component 704 may include an image sensor for capturing images and/or video, such as a complementary metal oxide semiconductor (CMOS) image sensor, and/or the like. An audio input/output component 706 may also be included to allow a user to use voice for inputting information by converting audio signals. Audio I/O component 706 may allow the user to hear audio. A transceiver or network interface 722 transmits and receives signals between computer system 600 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 718, which may be a micro-controller, digital signal processor (DSP), or other processing component, that processes these various signals, such as for display on computer system 700 or transmission to other devices over a network 726 via a communication link 724. Again, communication link 724 may be a wireless communication in some embodiments. Processor 718 may also control transmission of information, such as cookies, IP addresses, images, and/or the like to other devices.

Components of computer system 700 also include a system memory component 714 (e.g., RAM), a static storage component 714 (e.g., ROM), and/or a disk drive 716. Computer system 700 performs specific operations by processor 718 and other components by executing one or more sequences of instructions contained in system memory component 712. Logic may be encoded in a computer readable medium, which may refer to any medium that participates in providing instructions to processor 718 for execution. Such a medium may take many forms, including but not limited to, non-volatile media, volatile media, and/or transmission media. In various implementations, non-volatile media includes optical or magnetic disks, volatile media includes dynamic memory such as system memory component 712, and transmission media includes coaxial cables, copper wire, and fiber optics, including wires that comprise bus 710. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 700 may also include a short range communications interface 720. Short range communications interface 720, in various embodiments, may include transceiver circuitry, an antenna, and/or waveguide. Short range communications interface 720 may use one or more short-range wireless communication technologies, protocols, and/or standards (e.g., Wi-Fi, Bluetooth®, Bluetooth Low Energy (BLE), infrared, NFC, etc.).

Short range communications interface 720, in various embodiments, may be configured to detect other devices (e.g., primary user device 632, merchant device 602, etc.) with short range communications technology near computer system 700. Short range communications interface 720 may create a communication area for detecting other devices with short range communication capabilities. When other devices with short range communications capabilities are placed in the communication area of short-range communications interface 720, short range communications interface 720 may detect the other devices and exchange data with the other devices. Short range communications interface 720 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 720 may identify a local area network using a short-range communications protocol, such as Wi-Fi, and join the local area network. In some examples, computer system 700 may discover and/or communicate with other devices that are a part of the local area network using short range communications interface 720. In some embodiments, short range communications interface 720 may further exchange data and information with the other devices that are communicatively coupled with short range communications interface 720.

In various embodiments of the present disclosure, execution of instruction sequences to practice the present disclosure may be performed by computer system 700. In various other embodiments of the present disclosure, a plurality of computer systems 700 coupled by communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 724 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants/vendors and customers; however, a customer or consumer can pay, or otherwise interact with any type of recipient, including charities and individuals. Thus, "merchant" as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a non-transitory memory storing instructions; and
   a processor configured to execute the instructions to cause the system to:
   receive, from an application, a request to store first data associated with a transaction;
   based on transaction details contained in the first data, determine, by a mapping module of the system, that the first data is associated with a trailing transaction to an original transaction;
   determine, from a first unsharded reference table, a reference ID to use for the first data, wherein the reference ID corresponds to the original transaction;
   map, by the mapping module, the reference ID to the first data for tabulation in a second unsharded reference table; and
   transfer the first data to a first database shard, wherein the first database shard is different than a second database shard used to store second data associated with the original transaction.

2. The system of claim 1, wherein the instructions further cause the system to:
   receive a request to store additional data;
   determine, by the mapping module, that the additional data is associated with a child activity of the original transaction;
   determine, from the second unsharded reference table, the reference ID for the original transaction; and
   map the reference ID to the additional data associated with the child activity.

3. The system of claim 2, wherein the instructions further cause the system to:
   transfer the additional data associated with the mapped child activity to a corresponding database shard.

4. The system of claim 1, wherein the original transaction includes activity associated with the transaction and the activity is parent activity.

5. The system of claim 4, wherein the parent activity includes a plurality of records and identifiers.

6. The system of claim 1, wherein the reference ID is a root ID maintained in the first unsharded reference table.

7. The system of claim 6, wherein the root ID creates a hierarchical model with parent activity and child activity using the reference ID as a root ID.

8. A method comprising:
   receiving, by a computer system, a request to store first data associated with a transaction;
   based on transaction details contained in the first data, determining, by the computer system, that the first data is associated with a trailing transaction to an original transaction;
   retrieving, from a first unsharded reference table and by the computer system, a root ID to use for the first data, wherein the root ID corresponds to the original transaction;
   mapping, by the computer system, the root ID to the first data for tabulation in a second unsharded reference table; and
   transferring the first data to a first database shard, wherein the first database shard is different than a second database shard used to store second data associated with the original transaction.

9. The method of claim 8, wherein the root ID was generated for the original transaction and mapped to the original transaction in the first unsharded reference table.

10. The method of claim 8, wherein the second data is parent activity data.

11. The method of claim 8, further comprising:
    determining the first data corresponds to a child activity of a parent activity corresponding to the original transaction; and
    identifying the root ID associated with the original transaction.

12. The method of claim 8, wherein the first data includes a user to user payment transaction.

13. The method of claim 8, wherein the root ID is used in two-sided bookkeeping.

14. The method of claim 8, wherein the root ID is used to reference trailing transaction data.

15. A non-transitory machine-readable medium having instructions stored thereon, wherein the instructions are executable to cause a machine to perform operations comprising:
    receiving, from an application, a request to store first data associated with a transaction;
    based on transaction details contained in the first data, determining, by a mapping module included in the instructions, that the first data is associated with a trailing transaction to an original transaction;

determining, from a first unsharded reference table, a reference ID to use for the first data, wherein the reference ID corresponds to the original transaction;

mapping, by the mapping module, the reference ID to the first data for tabulation in a second unsharded reference table; and transferring the first data to a first database shard, wherein the first database shard is different than a second database shard used to store second data associated with the original transaction.

16. The non-transitory machine-readable medium of claim 15, wherein the operations further comprise:

receiving a request to store additional data;

determining, by the mapping module, that the additional data corresponds to child activity associated with the original transaction;

determining, from the second unsharded reference table, the reference ID for the original transaction; and mapping the reference ID to the additional data corresponding to the child activity.

17. The non-transitory machine-readable medium of claim 16, wherein the operations further comprise:

transferring the additional data corresponding to the mapped child activity to a corresponding database shard.

18. The non-transitory machine-readable medium of claim 15, wherein the original transaction includes parent activity.

19. The non-transitory machine-readable medium of claim 18, wherein the parent activity includes a plurality of records and identifiers corresponding to the original transaction.

20. The non-transitory machine-readable medium of claim 15, wherein the reference ID was generated for the original transaction as a root ID and is maintained in the first unsharded reference table.

* * * * *